United States Patent
Ryu et al.

(10) Patent No.: US 10,601,018 B2
(45) Date of Patent: Mar. 24, 2020

(54) ELECTRODE LEAD FOR A SECONDARY BATTERY, A POUCH TYPE SECONDARY BATTERY AND A BATTERY MODULE COMPRISING THE SAME

(71) Applicant: LG Chem, Ltd., Seoul (KR)

(72) Inventors: Jae-Uk Ryu, Daejeon (KR); Jeong-O Mun, Daejeon (KR); Dal-Mo Kang, Daejeon (KR); Su-Chang Kim, Daejeon (KR); Ji-Su Yoon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 107 days.

(21) Appl. No.: 15/945,310

(22) Filed: Apr. 4, 2018

(65) Prior Publication Data

US 2018/0315979 A1 Nov. 1, 2018

(30) Foreign Application Priority Data

Apr. 26, 2017 (KR) .......................... 10-2017-0053955

(51) Int. Cl.
*H01M 2/30* (2006.01)
*H01M 2/22* (2006.01)
*H01M 2/06* (2006.01)
*H01M 2/20* (2006.01)
*H01M 10/04* (2006.01)
*H01M 2/34* (2006.01)

(52) U.S. Cl.
CPC .............. *H01M 2/22* (2013.01); *H01M 2/06* (2013.01); *H01M 2/206* (2013.01); *H01M 2/30* (2013.01); *H01M 2/34* (2013.01); *H01M 10/0413* (2013.01)

(58) Field of Classification Search
CPC .................................. H01M 2/30; H01M 2/22
See application file for complete search history.

(56) References Cited

U.S. PATENT DOCUMENTS

| | | | |
|---|---|---|---|
| 2006/0115722 A1* | 6/2006 | Kim | H01M 2/263 429/161 |
| 2007/0202399 A1 | 8/2007 | Shin et al. | |
| 2007/0292753 A1* | 12/2007 | Zama | H01M 2/0212 429/181 |
| 2011/0305945 A1 | 12/2011 | Tada et al. | |

(Continued)

FOREIGN PATENT DOCUMENTS

| CN | 205508932 U | 8/2016 |
|---|---|---|
| JP | 2004-158434 A | 6/2004 |

(Continued)

OTHER PUBLICATIONS

Notice of Reason for Refusal dated Aug. 12, 2019, issued in corresponding Korean Patent Application No. 10-2017-0053955.

*Primary Examiner* — Olatunji A Godo

(74) *Attorney, Agent, or Firm* — Morgan, Lewis & Bockius LLP

(57) ABSTRACT

Provided is an electrode lead for a secondary battery that is less susceptible to cracks and has improved insulation, and a pouch type secondary battery and a battery module comprising the same. The electrode lead for a secondary battery according to the present disclosure is an electrode lead electrically connected to an electrode assembly, and the electrode lead includes a flat metal conductor and a coverlay type insulating film having an exposed shape at an electrically connected part of the metal conductor.

13 Claims, 14 Drawing Sheets

(56) References Cited

U.S. PATENT DOCUMENTS

2013/0236753 A1\* 9/2013 Yue .................... H01M 2/1077
429/62
2016/0204410 A1 7/2016 Heo

FOREIGN PATENT DOCUMENTS

| JP | 5684462 B2 | 3/2015 |
| KR | 20-0289707 Y | 9/2002 |
| KR | 10-2007-0049553 A | 5/2007 |
| KR | 10-0868256 B1 | 11/2008 |
| KR | 10-2016-0087220 A | 7/2016 |
| KR | 10-2017-0032098 A | 3/2017 |

\* cited by examiner

ELECTRODE LEAD FOR A SECONDARY BATTERY, A POUCH TYPE SECONDARY BATTERY AND A BATTERY MODULE COMPRISING THE SAME

TECHNICAL FIELD

The present application claims priority to Korean Patent Application No. 10-2017-0053955 filed in the Republic of Korea on Apr. 26, 2017, the disclosures of which are incorporated herein by reference.

The present disclosure relates to a pouch type secondary battery, and more particularly, to an electrode lead that is a component provided in a pouch type secondary battery, and a pouch type secondary battery and a battery module comprising the same. The present disclosure also relates to methods for manufacturing the electrode lead, the pouch type secondary battery and the battery module.

BACKGROUND

Recently, with the dramatically increasing demand for portable electronic products such as laptop computers, video cameras, mobile phones, and the like, along with the active development of electric vehicles, storage batteries for energy storage, robots, satellites, and the like, research and development for high-performance secondary batteries capable of repeatedly recharging has been actively made. Currently, among commercially available secondary batteries, lithium secondary batteries have little or no memory effect, and thus they are gaining more attention than nickel-based secondary batteries for their advantages of free charging/discharging, low self-discharging, and high energy density.

More recently, secondary batteries are being widely used in not only small devices such as portable electronic products but also medium- and large-scale devices such as vehicles and energy storage systems. In particular, with the steady exhaustion of carbon energy and increasing interest in the environment, the demand for hybrid electric vehicles and electric vehicles is increasing all over the world including United States, Europe, Japan, and the Republic of Korea. In such hybrid electric vehicles or electric vehicles, the most essential component is a battery pack that gives a driving power to an automobile motor. Because hybrid electric vehicles or electric vehicles are supplied with power for driving the vehicles through charging/discharging of battery packs, as compared to vehicles powered by an engine alone, they have higher fuel efficiency and can eliminate or lessen the emission of pollutants, and by this reason, the number of users is now increasing.

When a secondary battery is used for an electric vehicle, to increase the capacity and output, a battery pack is manufactured using battery modules in which many secondary batteries are connected in series and/or in parallel. In this instance, a pouch type secondary battery is widely used in medium- and large-sized devices because it is easy to stack.

FIG. 1 shows a general pouch type secondary battery.

Referring to FIG. 1, the general pouch type secondary battery 1 has a sealing part 30 formed by sealing a pouch case 10 in which an electrode assembly 20 is received, and electrode leads 40, 45 are welded to a positive electrode tab and a negative electrode tab of the electrode assembly 20 respectively and exposed through the pouch case 10. A lead film 50 is interposed between the pouch case 10 and the electrode leads 40, 45.

As shown in FIG. 2, the pouch type secondary batteries 1 are stacked and connected in series and/or in parallel such that the electrode leads 40, 45 provided in each of two adjacent pouch type secondary batteries 1 are connected to a molded product 60, to construct a battery module 11 with improved capacity and output.

Meanwhile, in using the battery module 11 including the plurality of pouch type secondary batteries 1, it is very important to ensure safety. Particularly, in the case of hybrid electric vehicles or electric vehicles on which people ride, there is a concern that an accident may lead to a loss of human life.

Accordingly, a reliability test was conducted to evaluate safety in an impact or vibration situation after the manufacture of the battery module 11. In this instance, however, due to deformation of the electrode leads 40, 45 caused by compression of the battery module 11, as shown in FIG. 3, there is a short circuit risk that will occur at the position 'A' between the electrode leads 40, 45 with different polarities not directly connected to each other. In addition, in case that a swelling phenomenon occurs or an external impact is applied while the battery module 11 is used, there is a short circuit risk caused by a contact of the electrode leads 40, 45 with different polarities not directly connected to each other.

When a short circuit occurs due to an electrical contact between the electrode leads 40, 45 provided in adjacent pouch type secondary batteries 1, an overcurrent flows, and accordingly, there is a concern with an accident such as overheat or an explosion of adjacent different pouch type secondary batteries. Therefore, there is a need for an approach to minimize a short circuit risk caused by an unintentional contact between the electrode leads 40, 45 while not greatly changing the existing battery module manufacturing process.

The present disclosure is designed to solve the problem such as the foregoing statements, and therefore the present disclosure is directed to providing an electrode lead for a secondary battery that is less susceptible to cracks and has improved insulation.

The present disclosure is further directed to providing a pouch type secondary battery comprising the electrode lead with high reliability and improved insulation.

The present disclosure is further directed to providing a battery module for preventing a short circuit between electrode leads with different polarities and ensuring safety, manufactured by connecting the pouch type secondary batteries.

These and other objects and advantages of the present disclosure will be understood by the following description.

To achieve the object, an electrode lead for a secondary battery according to the present disclosure is an electrode lead electrically connected to an electrode assembly, and the electrode lead includes a flat metal conductor and a coverlay type insulating film having an exposed shape at an electrically connected part of the metal conductor.

According to an aspect of the present disclosure, the insulating film includes any one material of PI, PET and PEN. The insulating film may be adhered or coated. The exposed shape may be tailored, punched or hot-pressed.

According to another aspect of the present disclosure, the insulating film is a composite film having an adhesive coated on any one film of PI, PET and PEN. In this instance, the adhesive layer is preferably silicone.

According to still another aspect of the present disclosure, the insulating film is formed covering two surfaces of the metal conductor, the exposed shape is formed on two surface of one side of the metal conductor, and on the other side of the metal conductor electrically connected to the electrode assembly, a sealant film layer is adhered from two surfaces of the metal conductor and protrudes from side surfaces of the metal conductor.

The sealant film layer may include one selected from the group consisting of polypropylene, polypropylene chloride, polyethylene, ethylene-propylene copolymer, ethylene-acrylate copolymer, propylene-acrylate copolymer and casted polypropylene, or their mixtures.

To achieve another object, a pouch type secondary battery according to the present disclosure includes an electrode assembly including a positive electrode and a negative electrode with a separator interposed between, an electrode lead electrically connected to each of the positive electrode and the negative electrode and electrically connected to the electrode assembly, and a pouch case in which the electrode assembly is received such that an end of one side of the electrode lead protrudes, wherein the electrode lead includes a flat metal conductor and a coverlay type insulating film having an exposed shape at an electrically connected part of the metal conductor.

In a preferred example, the insulating film is formed covering two surfaces of the metal conductor, and on one side of the metal conductor electrically connected to the electrode assembly, a sealant film layer is adhered from two surfaces of the metal conductor and protrudes from side surfaces of the metal conductor, and the exposed shape is formed on two surfaces of the other side of the metal conductor. Additionally, the pouch case and the electrode lead are thermally bonded with the sealant film layer interposed between.

To achieve still another object, a battery module according to the present disclosure includes a secondary battery stack formed of a stack of pouch type secondary batteries according to the present disclosure, wherein the electrode lead protrudes from the pouch case and has a bent part such that an end is bent to the left or right, the exposed shape of the insulating film of the electrode lead is positioned at flat bottom of the bent part, and the bent parts of the electrode leads of adjacent pouch type secondary batteries overlap, and the metal conductors exposed by the exposed shape are welded to each other.

At least one battery module according to the present disclosure may be combined to manufacture a battery pack. The battery pack may be applied to vehicles.

According to the present disclosure, the coverlay type insulating film of a material with insulation performance such as PI, PET and PEN is applied to the electrode lead to prevent a short circuit from occurring due to an unintentional contact between electrode leads with different polarities, thereby ensuring safety. The exposed shape is applied to part of the insulating film to enable electrical connection such as welding.

The insulating film prevents a short circuit and maintains insulation even though adjacent electrode leads contact each other. Accordingly, there is an effect in improving safety of a pouch type secondary battery and a battery module including the electrode lead.

The insulating film having the electrode lead ensures safety from the external physical impacts and heat generation, and reduces a likelihood that heat generated in the heating process during welding is transferred from the electrode lead to the electrode assembly.

Additionally, the insulating film absorbs or distributes physical forces applied to the metal conductor part of the electrode lead, thereby reducing the cracking of the metal conductor.

BRIEF DESCRIPTION OF THE DRAWINGS

The accompanying drawings illustrate preferred embodiments of the present disclosure and together with the following detailed description, serve to provide further understanding of the technical aspects of the present disclosure, and thus, the present disclosure is not construed as being limited to the statements in such drawings.

DETAILED DESCRIPTION OF THE PREFERRED EMBODIMENTS

Figure 1:
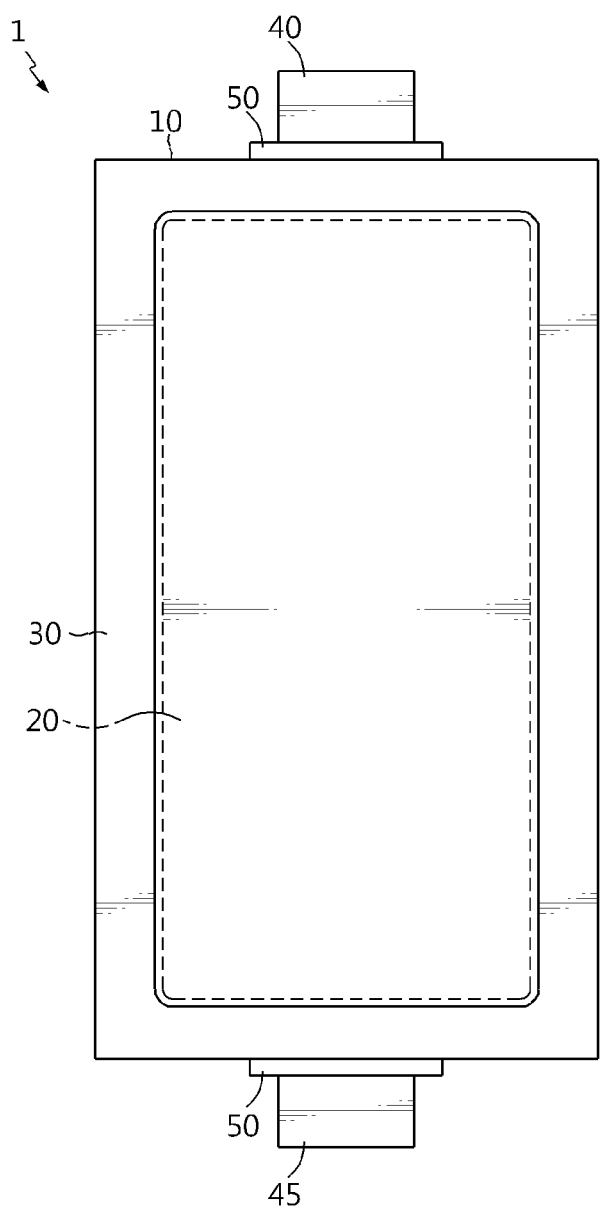
FIG. 1 is a schematic diagram of a general pouch type secondary battery.
Figure 2:
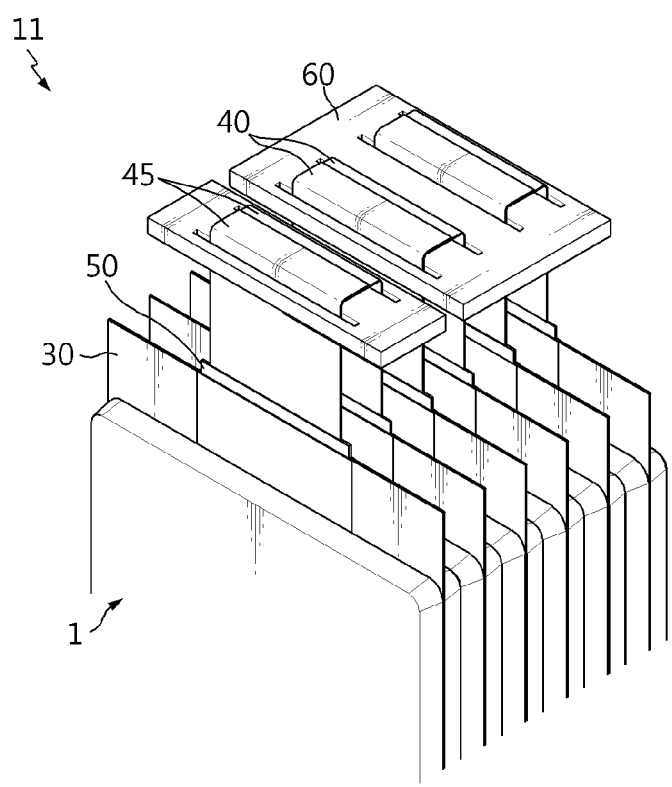
FIG. 2 is a perspective view of a conventional battery module.
Figure 3:
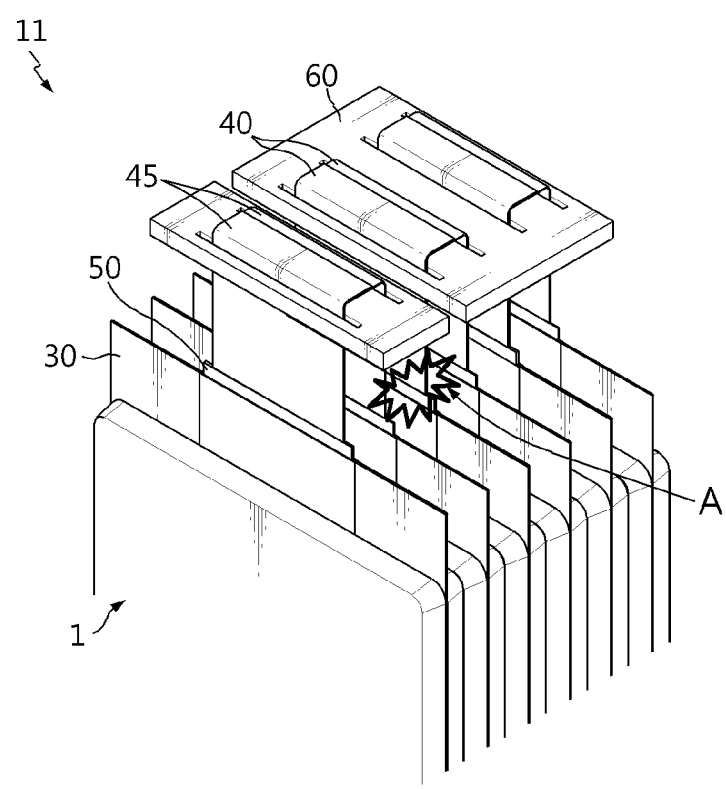
FIG. 3 shows a short circuit occurring in the battery module of FIG. 2.

These and other objects and advantages of the present disclosure will be understood by the following description, and more clearly apparent from the embodiments of the present disclosure. Additionally, it can be easily seen that the objects and advantages of the present disclosure will be realized by the means set forth in the appended claims and their combination.

Hereinafter, the preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to the technical aspects of the present disclosure on the basis of the principle that the inventor is allowed to define terms appropriately for the best explanation.

Therefore, the embodiments described herein and illustrations shown in the drawings are just a most preferred embodiment of the present disclosure, but not intended to fully describe the technical aspects of the present disclosure, so it should be understood that other equivalents and modifications could be made thereto at the time the application was filed.

In the present disclosure, an electrode lead is electrically connected to a positive electrode (or a positive electrode tab drawn from a positive electrode uncoated region or a positive electrode) and/or a negative electrode (or a negative electrode tab drawn from a negative electrode uncoated region or a negative electrode) of an electrode assembly, and is used as a positive electrode terminal or a negative electrode terminal. The following embodiment is described on the basis of an example in which the electrode lead is connected to a positive electrode tab and a negative electrode tab (hereinafter, an electrode tab).

Figure 4A:
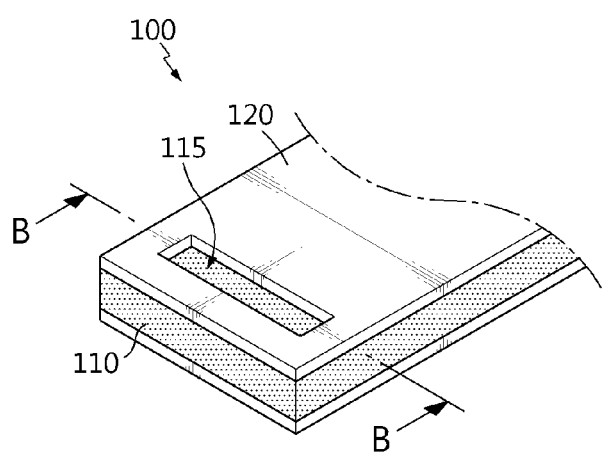
FIGS. 4A, 4B, 5A and 5B are diagrams illustrating an electrode lead according to a preferred embodiment of the present disclosure.
Figure 4B:
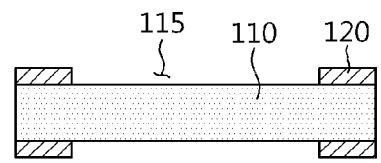
Figure 5A:
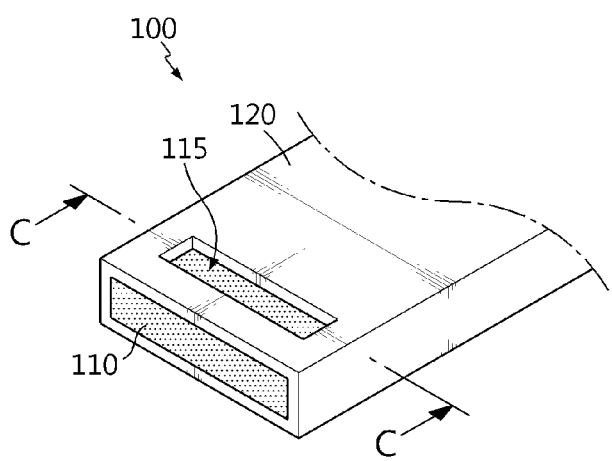
Figure 5B:
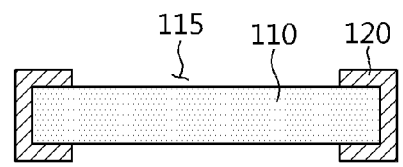

FIGS. 4A, 4B, 5A and 5B are diagrams illustrating the electrode lead according to a preferred embodiment of the present disclosure. FIG. 4A is a perspective view of the electrode lead, and FIG. 4B is a cross-sectional view taken along the line B-B in FIG. 4A. FIG. 5A is another perspective view of the electrode lead, and FIG. 5B is a cross-sectional view taken along the line C-C in FIG. 5A.

Referring to FIGS. 4A, 4B, 5A and 5B, the electrode lead 100 includes a flat metal conductor 110. A coverlay type insulating film 120 having an exposed shape 115 at an electrical connection part of the metal conductor 110 is formed. Here, the exposed shape 115 may be called a cutout, an opening, a hole, a hollow, a weld opening, or the like.

The metal conductor 110 may be selected from the group consisting of copper (Cu), aluminum (Al), nickel (Ni), iron (Fe), carbon (C), chrome (Cr), manganese (Mn) and alloys including two or more, but is not limited thereto, and includes any material without limitation when the material is electrically connected to the electrode tab. The metal conductor 110 may include aluminum, and selectively, the aluminum may be alloys including elements selected from the group consisting of silicon, boron, germanium, arsenic, antimony, copper, magnesium, manganese, zinc, lithium, iron, chrome, vanadium, titanium, bismuth, potassium, tin, lead, zirconium, nickel, cobalt, and their combination.

The mechanical strength and flexibility may be taken into account when selecting the metal conductor 110. Preferably, aluminum is used for the positive electrode, and copper, nickel, or metal plated with nickel is used for the negative electrode, but is not limited thereto. Additionally, the metal conductor 110 may be 0.1 mm to 1.0 mm thick and 1 mm to 200 mm wide, but is not limited thereto, and the metal conductor 110 may have preset dimensions according to the use of the corresponding pouch type secondary battery.

The insulating film 120 may be formed, as shown in FIGS. 4A and 4B, on an upper surface and a lower surface of the metal conductor 110, and preferably, as shown in FIGS. 5A and 5B, may cover two surfaces including the upper surface and the lower surface and even the side surfaces of the metal conductor 110. Although FIGS. 4A, 4B, 5A and 5B show that the insulating film 120 is not formed on a finished surface of one side of the metal conductor 110 which is thereby exposed, the insulating film 120 may be formed on this area.

Preferably, the insulating film 120 includes any one material of polyimide (PI), polyethylene terephthalate (PET) and polyethylenenaphthalate (PEN). These materials have all good insulation, a high tensile strength and good bending resistance. Even in case that the electrode lead 100 including the insulating film 120 is bent as in battery module embodiment as described below, it is required that the insulating film 120 is not damaged, and thus bending resistance is a very important selection criterion. Accordingly, epoxy that has been widely used as an insulating material is unsuitable for the insulating film 120 because epoxy does not satisfy the bending resistance requirement.

The insulating film 120 may be adhered or coated on the metal conductor 110. The insulating film 120 provides insulation to the electrode lead 100, in particular, the entire surface of the exposed part through the pouch case, thereby preventing a short circuit from occurring even when adjacent electrode leads with different polarities come into contact with each other, and maintaining the insulation resistance.

Particularly, it should be noted that the insulating film 120 is in coverlay type. In the specification, the term coverlay is used in the following sense. The term cover refers to 'shield', 'covering' and 'sheathing', and the term lay refers to 'lay over ~' by dictionary. The coverlay as used herein refers to an element commonly called 'coverlay' applied to protect a circuit pattern in FBCB, as well as a separate element laid over, covering a metal conductor of an electrode lead. Preferably, a thin film which is a separate element in film type is tightly adhered to the metal conductor 110 and added to the metal conductor 110 with integrity.

In earlier cases, for the purpose of anticorrosion, the electrode lead was coated with an oxidization film by oxidizing the metal conductor, or after the manufacture of the battery module, a liquid material such as epoxy was coated on the metal conductor and cured. Those skilled in the art will know that the coverlay type insulating film 120 of the present disclosure is different from the conventional cases.

The coverlay type insulating film 120 is formed by adhesion or coating. A method that tightly adheres the insulating film 120 to the metal conductor 110 is the use of a thin film having an adhesive property per se, or the use of a thin film with an addition of an adhesive. In addition, a method such as thermal compression may be used.

The exposed shape 115 of the insulating film 120 may be formed at the exposed area through the pouch case, for example, at least one side of the metal conductor 110. The exposed shape 115 is where the surface of the metal conductor 110 is exposed by a method such as welding for electrical connection with a different element. Depending on a connection method, it is necessary to form the exposed shape 115 on two surfaces of the electrode lead 100.

The process of establishing an electrical connection is taken into account when designing the size and position of the exposed shape 115. When the size of the exposed shape 115 is too small, the welded part is narrow, and an interference between laser and the insulating film 120 is problematic during welding, and when the size of the exposed shape 115 is too large, it is difficult to prevent a short circuit with adjacent electrode lead, and accordingly, the size of the exposed shape 115 may be selected within optimum range.

A method for forming the exposed shape 115 may be tailoring, punching, or hot pressing. In case that the insulating film 120 is adhered, the insulating film 120 with the exposed shape 115 pre-tailored open is adhered, or after the insulating film 120 is adhered, the exposed shape 115 may be formed by drilling or punching only the insulating film 120 of the corresponding area with an appropriate machine such as a micro drill or punch. Depending on the material of the insulating film 120, only a specific area may be removed by melting by a method such as hot pressing, and thus the exposed shape 115 may be formed by hot pressing.

The insulating film 120 may be formed by applying a photosensitive overlay composition rather than the adhesive insulating film 120 to the metal conductor 110 by a coating method. In this case, through exposure and development such as photolithography, the exposed shape 115 may be formed at a desired area. The photosensitive overlay composition has good plasticity. However, studies of the photosensitive overlay composition satisfying the bending resistance requirement must take precedence.

Figure 6:
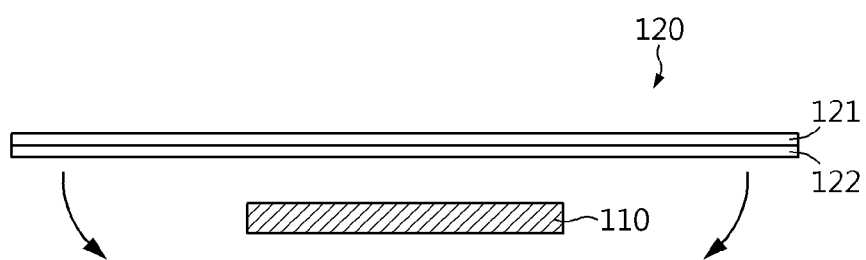
FIG. 6 shows a preferred form of an insulating film.

The most preferred form of the insulating film 120 is as shown in FIG. 6.

Referring to FIG. 6, the insulating film 120 is a composite film in which any one film 121 of PI, PET and PEN is coated with an adhesive 122.

The film 121 may be 1 to 50 μm thick. When the thickness of the film 121 is below the above-described range, the film 121 fails to exhibit a desired insulation property or when the metal conductor 110 deforms upon application of gentle vibration or in the event that the secondary battery falls, the film 121 is susceptible to cracking. Additionally, when the thickness is larger than 50 μm, the film 121 may be damaged in the secondary battery manufacturing process such as welding with the electrode tab or during the use of the secondary battery, resulting in exposure of the surface of the metal conductor 110. However, preferably, the film 121 may be formed in the range of 10 to 30 μm to effectively protect the metal conductor 110 and prevent the electrode lead 100 from being too thick.

For the adhesive layer 122, an epoxy adhesive is commonly applied, but silicone with good bending resistance is desirable. The adhesive layer 122 may be formed in the range of 20 to 40 μm in view of the adhesive strength, taking the thickness of the film 121 into account. If necessary, a functionality imparting element such as a flame retardant additive may be added to the adhesive layer 122.

The composite film preferably has heat-resistant adhesion, electrical insulation, flame retardancy, bending resistance and uniform flowability of the adhesive, and as shown in FIG. 6, the adhesive layer 122 may be adhered to the metal conductor 110 around the metal conductor 110 in a manner of wrapping two surfaces of the metal conductor 110 in the arrow direction when applied facing a wide surface of the metal conductor 110.

Figure 7:
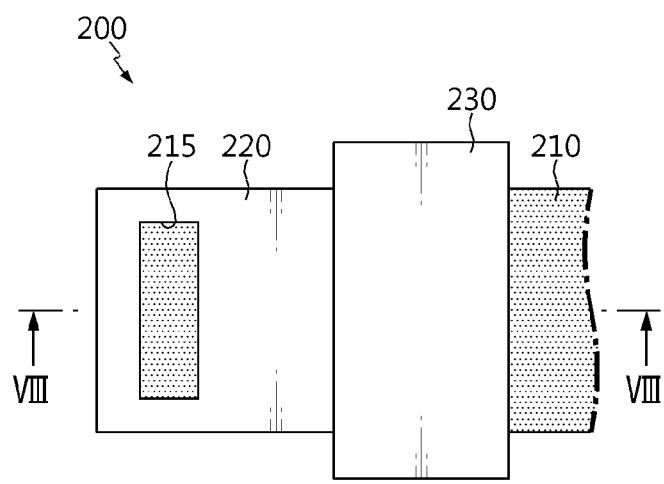
FIG. 7 is a diagram illustrating an electrode lead according to another embodiment of the present disclosure.

FIG. 7 is a top view of the electrode lead according to another embodiment of the present disclosure.

Referring to FIG. 7, the electrode lead 200 includes a flat metal conductor 210, and a coverlay type insulating film 220 having an exposed shape 215 at an electrical connection part of the metal conductor 210 is formed in the same way as the previous embodiment.

Here, the exposed shape 215 is formed on two surfaces of one side of the metal conductor 210, and on the other side of the metal conductor 210 electrically connected to the electrode assembly of the secondary battery, a sealant film layer 230 is adhered from two surfaces of the metal conductor 210 and protrudes from the side surface of the metal conductor 210.

FIGS. 8A-8D are cross-sectional views taken along the line VIII-VIII of FIG. 7, showing a variety of side cross sectional variations of the electrode lead 200.

Figure 8A:
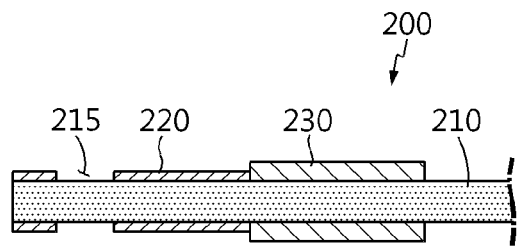
FIGS. 8A-8D are cross-sectional views taken along the line of FIG. 7.
Figure 8B:
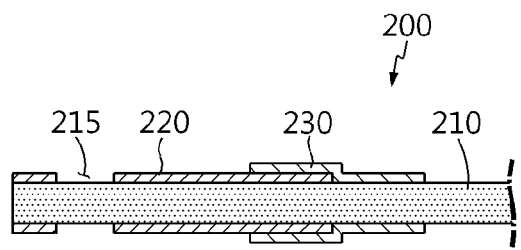
Figure 8C:
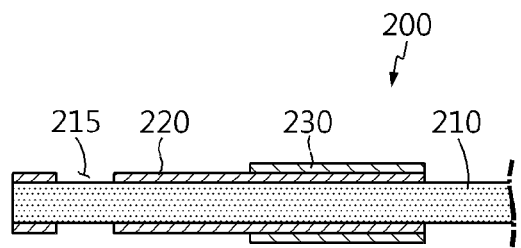
Figure 8D:
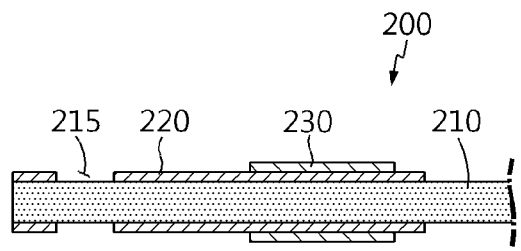

Referring to FIGS. 8A-8D, the sealant film layer 230 may be formed successively from an area where the insulating film 220 ends, or may be formed on the upper surface of the insulating film 220. Referring to FIG. 8A, the sealant film layer 230 is adhered onto the metal conductor 210 successively from an area where the insulating film 220 ends. Referring to FIG. 8B, the sealant film layer 230 is adhered onto part of the insulating film 220. Referring to FIG. 8C, to align the area where the insulating film 220 ends with the area where the sealant film layer 230 ends, the sealant film layer 230 is adhered onto the insulating film 220. Referring to FIG. 8D, the sealant film layer 230 is adhered onto the insulating film 220, and the insulating film 220 extends to the other side of the metal conductor 210 beyond the sealant film layer 230.

FIG. 8A shows the case in which the insulating film 220 and the sealant film layer 230 are formed irrespective of the order. FIGS. 8B-8D show the case in which the insulating film 220 is formed on the metal conductor 210 first and then the sealant film layer 230 is formed. The order may be reversed; the sealant film layer 230 may be formed first, and the insulating film 220 may be formed thereon. However, in view of the sealant film layer 230 being an element which is used considering sealability when sealing the pouch case, it will be preferred to form the insulating film 220 first and form the sealant film layer 230 thereon to bring the inner surface of the pouch case and the sealant film layer 230 into surface contact with each other.

The sealant film layer 230 may include one selected from the group consisting of polypropylene, polypropylene chloride, polyethylene, ethylene-propylene copolymer, ethylene-acrylate copolymer, propylene-acrylate copolymer and casted polypropylene, or their mixtures. The existing lead film may be used when the film is a polyolefin-based sealant film. Additionally, the sealant film layer 230 may be 0.05 mm to 0.2 mm thick and 3 mm to 25 mm wide, taking the dimension of the metal conductor 210 into account, but is not limited thereto.

When considering the current technology of sealing such that part of the sealant film layer 230 is exposed through the pouch case, as shown in FIG. 8A, preferably the electrode lead 200 has the insulating film 220 formed on only part of the metal conductor 210 positioned outside of the pouch case for the reason that an increase in thickness of a sealing part is prevented. The electrode lead 200 of the present disclosure is for preventing a short circuit between adjacent electrode leads with different polarities outside of the pouch case, and the insulating film 220 is not formed on part of the metal conductor 210 positioned inside of the pouch case, and the insulating film 220 may be formed only on part of the metal conductor 210 positioned outside of the pouch case.

Meanwhile, according to another aspect of the present disclosure, there is provided a method for manufacturing the electrode leads. Each step will be described below in detail.

First, flat metal conductors 110, 210 are provided.

An electrode lead material is molded in the shape of a wide plate to form a plate-shaped lead. Subsequently, the plate-shaped lead is cut in the shape of a strip to have a desired electrode lead width. Subsequently, the thickness of the metal plate is adjusted by applying the pressure by a rolling device while running a metal plate for electrode lead in the lengthwise direction. Subsequently, when the metal plate is cut to a desired length, the flat metal conductors 110, 210 are obtained.

Subsequently, insulating films 120, 220 are formed on the metal conductors 110, 210. The electrode lead 100 according to an embodiment may be manufactured through these steps, and the electrode lead 200 according to another embodiment may be manufactured by forming an insulating film 220 first and further forming a sealant film layer 230. The sealant film layer 230 may be attached to the metal conductor 210, for example, by thermal bonding under the temperature condition of 180° C., and in this process, thermal compression may be performed on the insulating film 220 together.

As mentioned previously, as shown in FIG. 8A, the electrode lead 200 may be manufactured by forming a sealant film layer 230 first and then forming an insulating film 220. That is, the insulating film 220 and the sealant film layer 230 may be formed in any order.

Some manufacturers manufacture electrode leads in the form of a lead element having a lead film attached to a metal conductor. For the lead film, polypropylene (PP) or polyethylene (PE) with the thickness of about 80 to 100 µm is used, and it is in a flat rectangular shape. Thus, when the lead element is purchased and the insulating film 220 is further applied thereto, the electrode lead of the present disclosure is manufactured.

Additionally, the present disclosure provides a pouch type secondary battery including the above-described electrode lead 200. In the present disclosure, unless otherwise stated, the electrode lead 200 of the present disclosure may be applied to a positive electrode lead 340 and/or a negative electrode lead 350 of the pouch type secondary battery 400 as described below.

Figure 9:
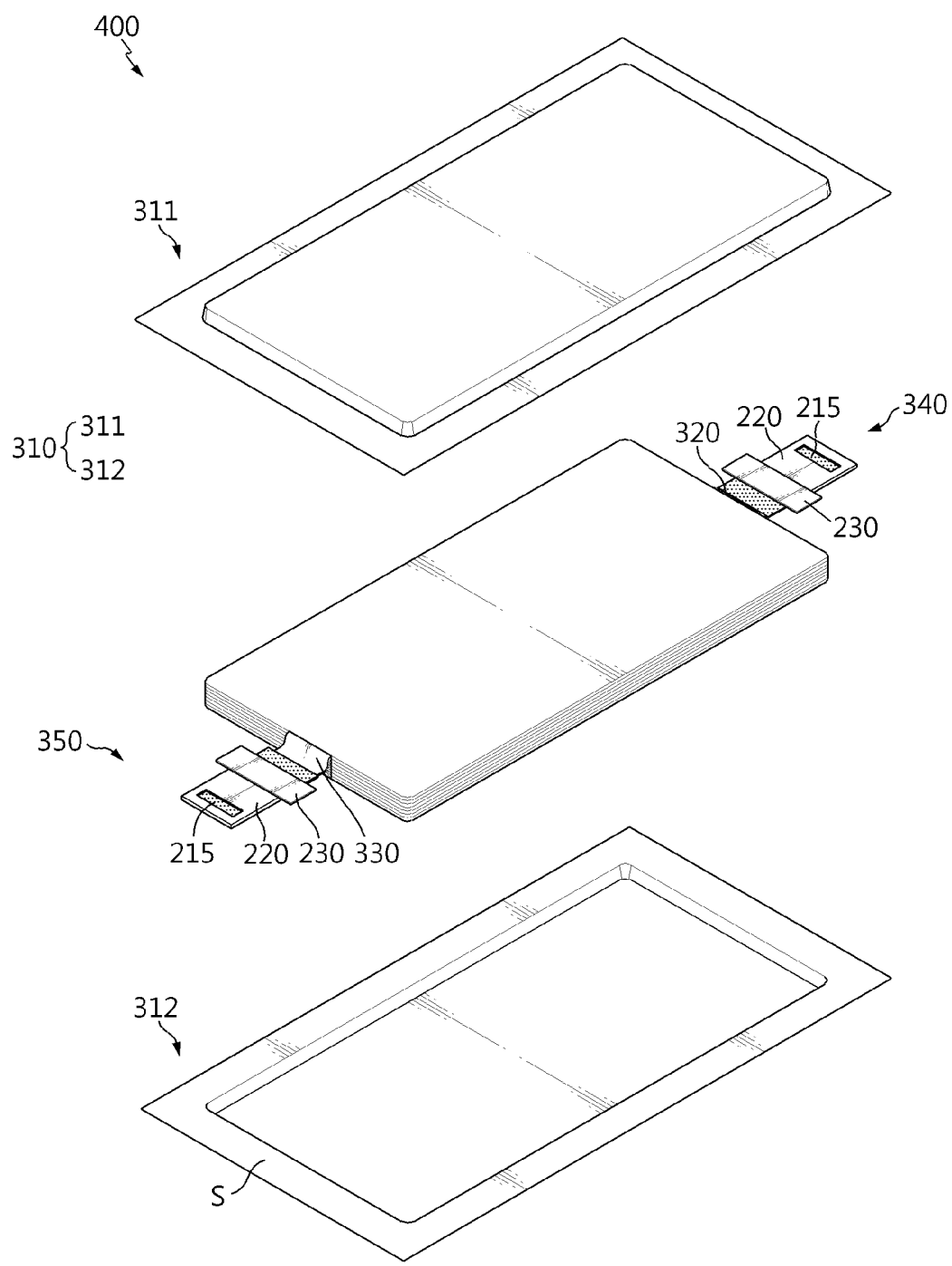
FIG. 9 is an exploded perspective view of a pouch type secondary battery according to another embodiment of the present disclosure.
Figure 10:
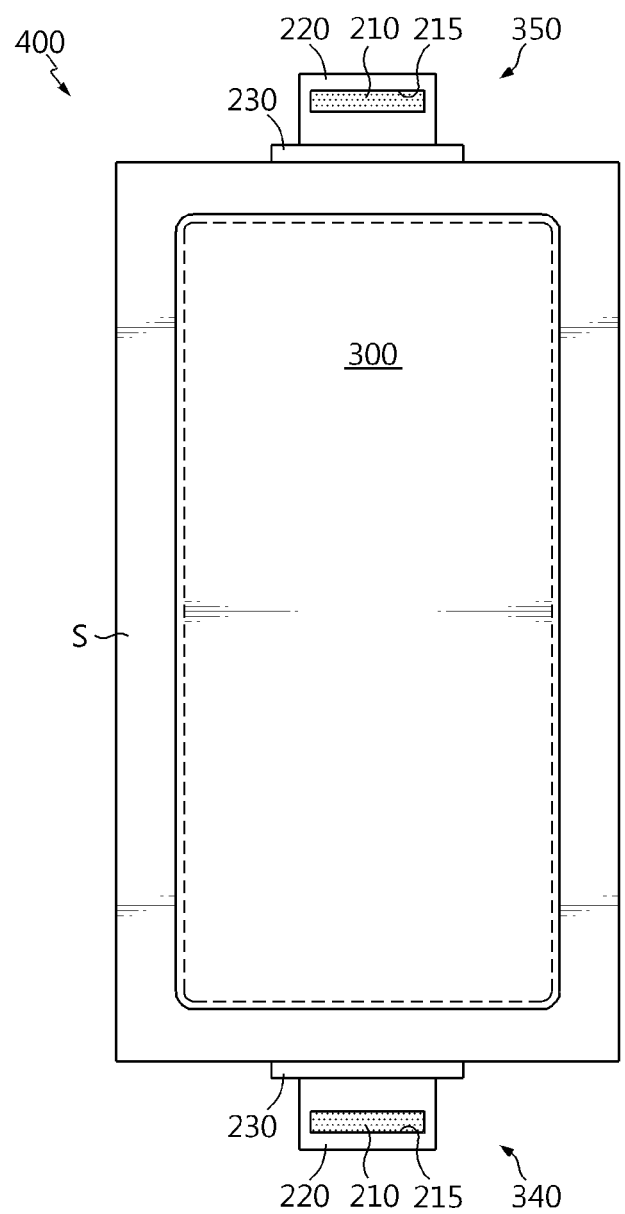
FIG. 10 is a plane view.

FIG. 9 is an exploded perspective view of the pouch type secondary battery according to another embodiment of the present disclosure, and FIG. 10 is a plane view. Referring to FIGS. 9 and 10, the pouch type secondary battery 400 according to the present disclosure includes an electrode assembly 300 and a pouch case 310, and a positive electrode tab 320 and a negative electrode tab 330 of the electrode assembly 300 are electrically connected, respectively, to the electrode leads 340, 350 according to the present disclosure.

In the present disclosure, the electrode tabs 320, 330 may be electrically connected to the electrode leads 340, 350 of the present disclosure by a method, for example, resistance welding, laser welding, ultrasonic welding and a conductive adhesive. However, the electrical connection of the electrode tab and the electrode lead is not limited to the exemplified method.

The electrode assembly 300 includes a positive electrode and a negative electrode with a separator interposed between. In this instance, the electrode assembly 300 may have a structure in which a positive electrode and a negative electrode are wound with a separator interposed between, or may have a structure in which a plurality of positive electrodes and a plurality of negative electrodes are stacked with separators interposed between. Additionally, the positive electrode and the negative electrode may be each formed with a structure in which an active material slurry is coated on an electrode assembly, and the slurry may be commonly formed by stirring a particulate active material, a secondary conductor, a binder and a plasticizer with an addition of a solvent.

Meanwhile, the electrode assembly 300 may have a region where the slurry is not coated on the electrode, and the electrode tabs corresponding to each electrode may be provided at the uncoated region. That is, the positive electrode tab 320 is attached to and drawn from the positive electrode of the electrode assembly 300, and the negative electrode tab 330 may be attached to and drawn from the negative electrode of the electrode assembly 300. The positive electrode tab 320 and the negative electrode tab 330 are electrically connected to the positive electrode lead 340 and the negative electrode lead 350 to form electrode terminals, and the ends of the positive electrode lead 340 and the negative electrode lead 350 protrude from the pouch case 310.

The pouch case 310 may include an upper pouch 311 and a lower pouch 312. At least one of the upper pouch 311 and the lower pouch 312 has a recessed internal space in which the electrode assembly 300 and an electrolyte solution are received.

Additionally, the pouch case 310 maintains hermetic sealing by the adhesion of sealing parts S of the upper pouch 311 and the lower pouch 312. That is, each of the upper pouch 311 and the lower pouch 312 has the sealing part S along the edges, and after the electrode assembly 300 and the electrolyte solution are received in the receiving space formed inside the edges, the sealing parts S are adhered to each other (sealed). In this instance, the adhesion of the sealing parts S of the upper pouch 311 and the lower pouch 312 may be accomplished by a method such as thermal bonding.

As above, the pouch type secondary battery 400 includes the electrode assembly 300, the positive electrode tab 320 and the negative electrode tab 330 extending from the electrode assembly 300, the electrode leads 340, 350 each welded to the positive electrode tab 320 and the negative electrode tab 330, and the pouch case 310 in which the electrode assembly 300 is received.

Additionally, to increase sealability with the pouch case 310 and ensure electrical insulation, the sealant film layer 230 is formed on parts of the upper and lower surfaces of the electrode leads 340, 350 and is embedded in the pouch case 310 with the ends of the electrode leads 340, 350 exposed.

The electrode leads 340, 350 is thermally bonded on the sealing parts S along the edges of the pouch case 310 together with the sealant film layer 230. The electrode leads 340, 350 are the electrode lead 200 according to an embodiment of the present disclosure as described previously. The electrode leads 340, 350 have the coverlay type insulating film 220 having the exposed shape 115 provided on the metal conductor 210.

Nearly the entire surface of the electrode leads 340, 350 exposed through the pouch case 310 except the exposed shape 115 is covered with the insulating film 220. The insulating film 220 imparts insulation to the electrode leads 340, 350. The exposed shape 115 corresponds to a weld opening for welding between adjacent electrode leads 340, 350 when constructing the battery module. According to the present disclosure, there is a pouch type secondary battery with improved insulation property and a battery module including the same.

Meanwhile, according to still another aspect of the present disclosure, there is provided a method for manufacturing the pouch type secondary battery 400. Each step will be described below in detail.

First, the electrode assembly 300 is prepared.

The electrode lead 340 according to the present disclosure is joined to the positive electrode tab 320 of the electrode assembly 300 by a method such as welding, and the electrode lead 350 is also joined to the negative electrode tab 330. In this way, the electrode leads 340, 350 are electrically connected to the electrode assembly 300.

The electrode assembly 300 is embedded in the receiving part of the pouch case 310, and the pouch case 310 is sealed by adhesion of the sealing parts S. The electrode leads 340, 350 are thermally bonded on the sealing parts S along the edges of the pouch case 310 together with the sealant film layer 230.

The manufacturing method uses the electrode leads 340, 350 according to the present disclosure pre-provided with the insulating film 220 and the sealant film layer 230.

As another example, the pouch type secondary battery may be manufactured by sealing the pouch case 310 using the electrode lead with no insulating film 220, and applying the coverlay type insulating film 220 to the electrode lead part protruding from the pouch case 310. However, if the insulating film 220 is applied after sealing of the pouch type secondary battery, there is a concern that positional accuracy is distorted when applying, and there is a risk that the exposed shape 115 is inaccurately positioned at an intended electrical connection area or other faults occur. This makes precise assembly difficult, reducing the process efficiency, and if it leads to an uncorrectable fault, there is a large loss in the process that has been already performed. Thus, it is preferred to manufacture the pouch type secondary battery in a manner of connecting with the electrode tab using the complete product type electrode lead of the present disclosure having the insulating film 220.

Although this embodiment describes the pouch type secondary battery including the electrode lead 200 as shown in FIG. 7, the pouch type secondary battery according to the present disclosure may be manufactured using the electrode lead 100 as shown in FIGS. 4A and 4B or 5A and 5B.

Figure 11:
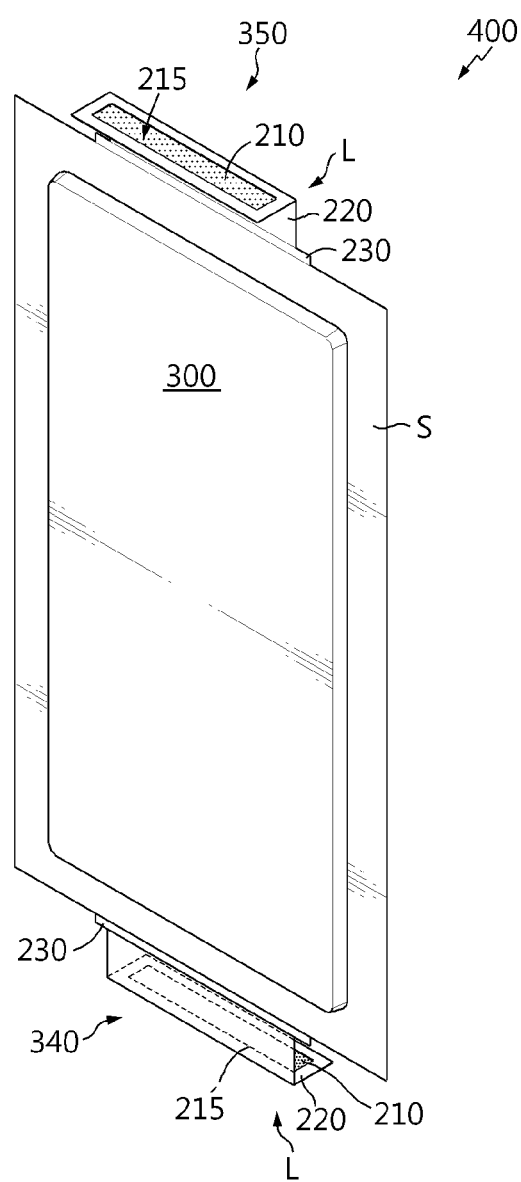
FIG. 11 is a perspective view of the pouch type secondary battery of FIG. 10 processed to be included in a battery module according to another embodiment of the present disclosure.

The pouch type secondary batteries of FIG. 10 are integrated to manufacture a battery module according to the present disclosure. The pouch type secondary batteries are in series mode alone or mixed mode of series and parallel by connection between adjacent electrode leads. FIG. 11 is a perspective view of the pouch type secondary battery 400 of FIG. 10 processed to be included in the battery module according to another embodiment of the present disclosure.

As shown in FIG. 11, the pouch type secondary battery 400 has the positive electrode lead 340 and the negative electrode lead 350, and the electrode leads 340, 350 protrude in opposite directions from the pouch type secondary battery 400. Additionally, each of the electrode leads 340, 350 has a bent part L such that their ends are bent to the left or right, for example, in the shape of the letter L to provide a flat vertical contact surface.

Specifically, when a direction in which the positive electrode lead 340 and the negative electrode lead 350 of the pouch type secondary battery 400 extend is referred to as a vertical (top-bottom) direction and a direction in which their ends are bent is referred to as a left/right direction, each of the positive electrode lead 340 and the negative electrode lead 350 protrudes up and down in the opposite direction from the body of the pouch type secondary battery 400, and is bent in the shape of the letter L with the end facing to the left and right in the opposite direction. Additionally, the exposed shape 215 of the insulating film 220 is positioned at the bent part L, i.e., the L-shaped bottom of the electrode leads 340, 350. The exposed shape 215 may extend longitudinally along the lengthwise direction (the horizontal direction, or the front-rear direction in the drawing) of the electrode leads 340, 350.

Figure 12:
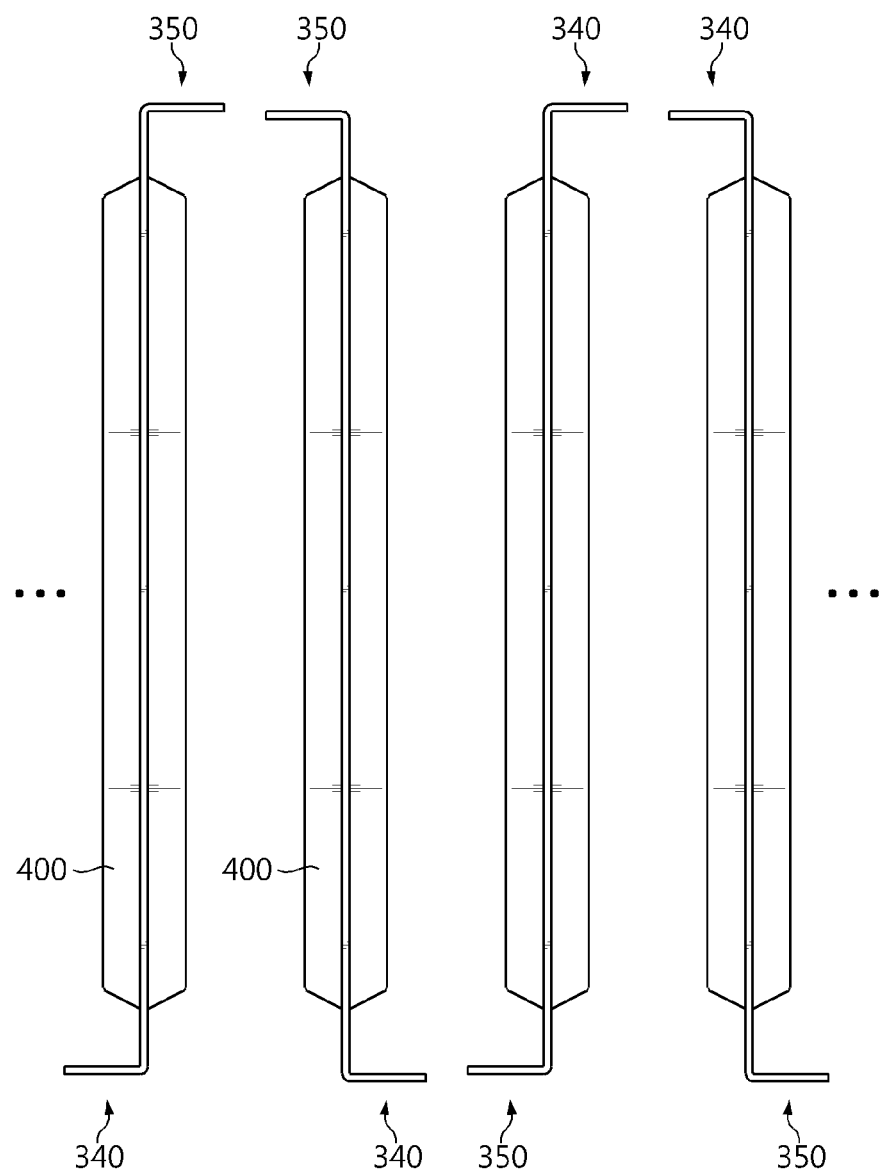
FIG. 12 is a diagram showing the arrangement of the pouch type secondary batteries shown in FIG. 11.
Figure 13:
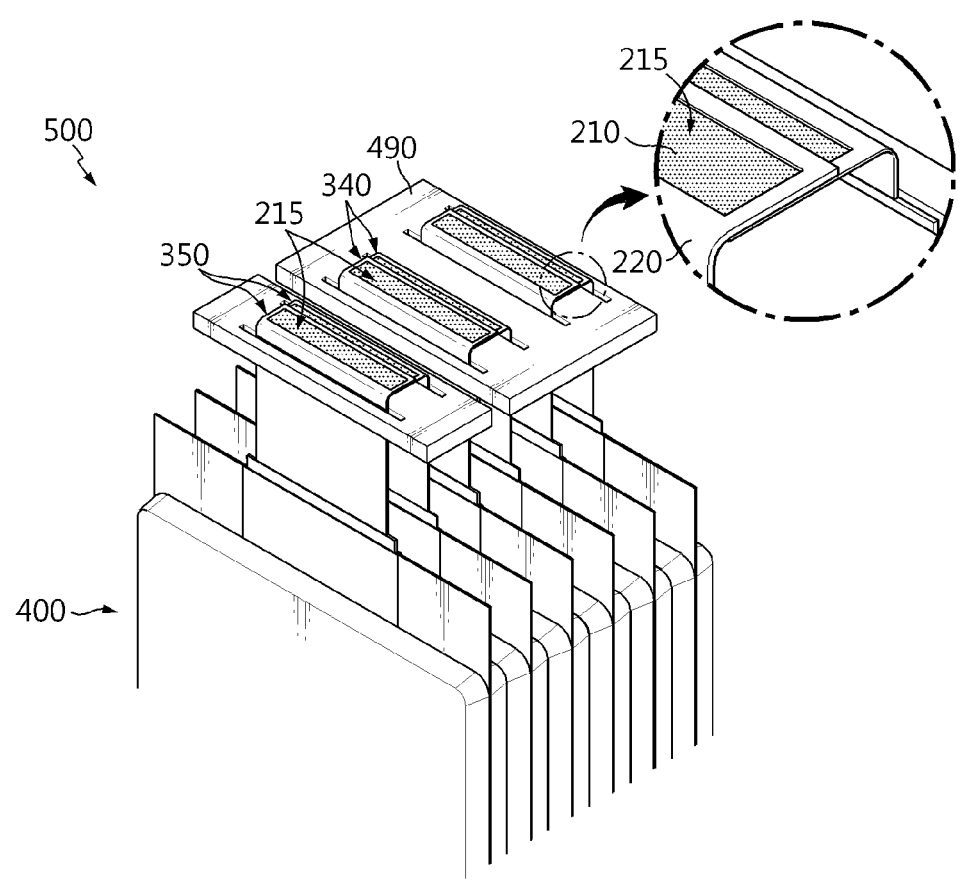
FIG. 13 is a perspective view showing a connection structure of the pouch type secondary batteries of FIG. 11.

FIG. 12 is a diagram showing the arrangement of the pouch type secondary batteries shown in FIG. 11, and FIG. 13 is a perspective view showing the connection structure of the pouch type secondary batteries of FIG. 11.

Referring to FIGS. 12 and 13, an arbitrary number of pouch type secondary batteries 400 are stacked to form a secondary battery stack. Additionally, each pouch type secondary battery 400 is connected in series in the order of stack and integrated to construct a battery module 500. As described above, the positive electrode lead 340 and the negative electrode lead 350 of each secondary battery 110 are each bent to the left and right in the opposite direction. The adjacent two secondary batteries 400 are arranged such that each of the electrode leads 340, 350 of one secondary battery and the electrode leads 340, 350 of the other secondary battery protrudes up and down in the same direction, and at the same time, the bent parts L are placed with the ends facing to the left and right in the opposite direction. Additionally, the bent parts L of the electrode leads 340, 350 with different polarities in adjacent secondary batteries 400 are stacked at the L-shaped bottom. The stacked bent parts L are electrically connected by welding of the metal conductors 210 exposed by the exposed shape 215 to construct a battery module 500. A structure such as a molded product 490 may be used to weld the electrode leads 340, 350.

When the insulating film 220 includes a PI material, the insulating film 220 does not melt by high welding heat. When the insulating film 220 includes a PET material, the insulating film 220 may melt by high welding heat. As the insulating film 220 has the exposed shape 215 pre-applied to a position corresponding to the welded part, an area that is meted by the welding heat will not be wide, and even though the insulating film 220 melts, there is no concern that the welding will be greatly influenced.

Figure 14:
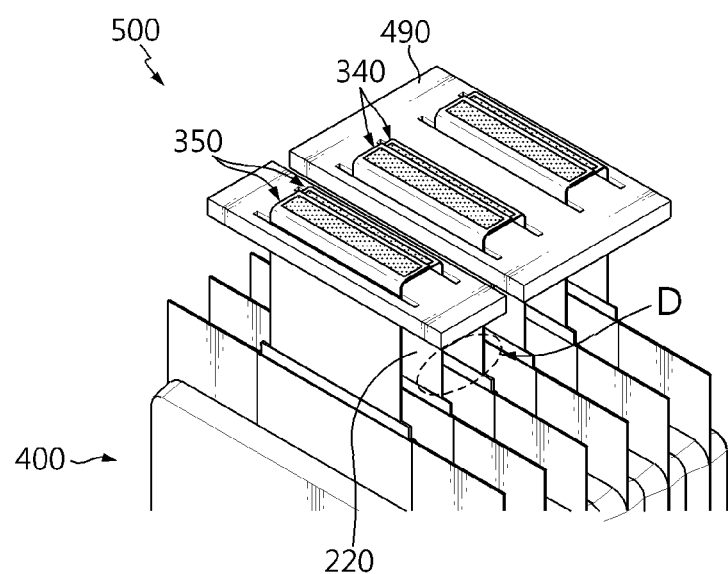
FIG. 14 shows that a short circuit is prevented between adjacent electrode leads in a battery module according to another embodiment of the present disclosure.

FIG. 14 shows that a short circuit is prevented between adjacent electrode leads in the battery module according to another embodiment of the present disclosure. Referring to FIG. 14, the battery module 500 according to the present disclosure includes a plurality of pouch type secondary batteries 400 having a pair of electrode leads 340, 350 electrically connected and stacked, and the insulating film 220 is formed on the surface of adjacent electrode leads 340, 350 along the stack direction of the secondary batteries 400. Even though the electrode leads 340, 350 with different polarities not directly connected between adjacent the pouch type secondary battery 400 come into contact with each other at the area 'D', the insulating film 220 prevents an electrical short circuit from occurring, thereby ensuring safety of the pouch type secondary battery while in use.

As the battery module 500 according to the present disclosure has the coverlay type insulating film 220 over the entire surface of the electrode leads 340, 350, even though the electrode leads 340, 350 come into contact with each other due to swelling phenomena or impacts, it is possible to prevent an unnecessary short circuit from occurring between them. In addition, because of protecting the surface of the insulating film 220, the insulating film 220 may play a role in preventing cracks from occurring in the metal conductor 210 due to the accumulation of mechanical stress or impact fatigue applied to the metal conductor 210 during module assembly.

Meanwhile, a battery pack according to the present disclosure may include at least one battery module according to the present disclosure. In addition to the battery module, the battery pack according to the present disclosure may further include various types of devices for controlling the charge/discharge of the battery module, for example, Battery Management System (BMS), a current sensor, a fuse, etc.

The pouch type secondary battery of the present disclosure may be used alone, and may be used in the form of a battery module or a battery pack including a plurality of pouch type secondary batteries. The pouch type secondary battery and/or the battery module of the present disclosure may be usefully utilized in various types of devices, for example, mobile phones, portable computers, smart phones, smart pads, netbooks, Light Electronic Vehicles (LEVs), electric vehicles, hybrid electric vehicles, plug-in hybrid electric vehicles, or energy storage systems. The structure of the devices and their manufacturing method are well known in the art, and its detailed description is omitted herein.

Although the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

The terms indicating directions as used herein such as up, down, left and right are used for convenience of description only, and it is obvious to those skilled in the art that the term may change depending on the position of the stated element or an observer.

What is claimed is:

1. An electrode lead for a secondary battery,
wherein the electrode lead is electrically connected to an electrode assembly, and
the electrode lead includes a flat metal conductor and a coverlay type insulating film having an exposed shape at an electrically connected part of the metal conductor,
wherein the electrode lead protrudes from the electrode assembly and has a bent part such that an end is bent to the left or right;
wherein the exposed shape of the insulating film of the electrode lead is positioned at a flat bottom of the bent part; and
wherein the bent part of the electrode lead is configured to overlap with a bent part of a second electrode lead of an adjacent electrode assembly, and the metal conductors exposed by the exposed shapes of the electrode lead and the second electrode lead are welded to each other.

2. The electrode lead for a secondary battery according to claim 1, wherein the insulating film includes any one material of PI, PET and PEN.

3. The electrode lead for a secondary battery according to claim 2, wherein the insulating film is adhered or coated.

4. The electrode lead for a secondary battery according to claim 3, wherein the exposed shape is tailored, punched or hot-pressed.

5. The electrode lead for a secondary battery according to claim 1, wherein the insulating film is a composite film having an adhesive coated on any one film of PI, PET and PEN.

6. The electrode lead for a secondary battery according to claim 5, wherein the adhesive layer is silicone.

7. The electrode lead for a secondary battery according to claim 1, wherein:
the insulating film is formed covering two surfaces of the metal conductor,
on one side of the metal conductor electrically connected to the electrode assembly, a sealant film layer is adhered from the two surfaces of the metal conductor and protrudes from side surfaces of the metal conductor, and
the exposed shape is formed on the two surfaces on the other side of the metal conductor.

8. The electrode lead for a secondary battery according to claim 7, wherein the sealant film layer includes one selected from the group consisting of polypropylene, polypropylene chloride, polyethylene, ethylene-propylene copolymer, ethylene-acrylate copolymer, propylene-acrylate copolymer and casted polypropylene, or their mixtures.

9. A battery module, comprising:
a secondary battery stack formed of a stack of pouch type secondary batteries, each of the pouch type secondary batteries including:
an electrode assembly including a positive electrode and a negative electrode with a separator interposed between;
an electrode lead electrically connected to each of the positive electrode and the negative electrode and electrically connected to the electrode assembly; and
a pouch case in which the electrode assembly is received such that an end of one side of the electrode lead protrudes,
wherein the electrode lead includes a flat metal conductor and a coverlay type insulating film having an exposed shape at an electrically connected part of the metal conductor,
wherein the electrode lead protrudes from the pouch case and has a bent part such that an end is bent to the left or right; and
the exposed shape of the insulating film of the electrode lead is positioned at a flat bottom of the bent part,
wherein the bent parts of the electrode leads of adjacent pouch type secondary batteries overlap, and the metal conductors exposed by the exposed shape are welded to each other.

10. The battery module according to claim 9, wherein:
the insulating film is formed covering two surfaces of the metal conductor,
on one side of the metal conductor electrically connected to the electrode assembly, a sealant film layer is adhered from the two surfaces of the metal conductor and protrudes from side surfaces of the metal conductor, and
the exposed shape is formed on the two surfaces on the other side of the metal conductor.

11. The battery module according to claim 10, wherein the pouch case and the electrode lead are thermally bonded with the sealant film layer interposed between.

12. The battery module according to claim 9, wherein the insulating film is a composite film having an adhesive coated on any one film of PI, PET and PEN.

13. The battery module according to claim 12, wherein the adhesive layer is silicone.

* * * * *